United States Patent
Nitschke et al.

[11] Patent Number: 5,540,461
[45] Date of Patent: Jul. 30, 1996

[54] PROCEDURE AND DEVICE FOR PROTECTING VEHICLE OCCUPANTS

[75] Inventors: Werner Nitschke, Ditzingen; Horst Wettstein, Karlsruhe, both of Germany

[73] Assignee: Robert Bosch GmbH, Stuttgart, Germany

[21] Appl. No.: 318,763

[22] PCT Filed: Apr. 2, 1993

[86] PCT No.: PCT/DE93/00313

§ 371 Date: Nov. 4, 1994

§ 102(e) Date: Nov. 4, 1994

[87] PCT Pub. No.: WO93/21043

PCT Pub. Date: Oct. 28, 1993

[30] Foreign Application Priority Data

Apr. 14, 1992 [DE] Germany .......................... 42 12 421.2

[51] Int. Cl.$^6$ .................................................. B60R 21/16
[52] U.S. Cl. ...................... 280/735; 280/806; 364/424.05
[58] Field of Search ..................................... 280/735, 806; 340/436, 438; 364/424.05; 307/10.1; 180/282

[56] References Cited

U.S. PATENT DOCUMENTS

| | | |
|---|---|---|
| 4,985,835 | 1/1991 | Sterler et al. . |
| 5,014,810 | 5/1991 | Mattes et al. . |
| 5,309,138 | 5/1994 | Tohbaru . |
| 5,424,583 | 6/1995 | Spies et al. .............................. 280/735 |
| 5,445,413 | 8/1995 | Rudolf et al. ........................... 280/735 |

FOREIGN PATENT DOCUMENTS

| | | |
|---|---|---|
| 3803426A1 | 8/1989 | Germany . |
| 4208714A1 | 9/1992 | Germany . |
| 4-252758 | 9/1992 | Japan ..................................... 280/735 |
| WO90/09298 | 8/1990 | WIPO . |
| WO90/11207 | 10/1990 | WIPO . |

OTHER PUBLICATIONS

W. Suchowerskyj, "Evolution en matiere de detecteurs de choc", *Ingenieurs de l'Automobile*, No. 6, Paris, France, pp. 69–77 (1982).
Japanese Publication No. JP4146848, *Patent Abstracts of Japan*, vol. 16, No. 428 (M–1307), Sep. 8, 1992.

*Primary Examiner*—Karin L. Tyson
*Attorney, Agent, or Firm*—Kenyon & Kenyon

[57] ABSTRACT

A device for the protection of occupants of a vehicle includes at least one acceleration sensor (10), an electronic device (20) for evaluating the output signal of the sensor (10), and a protective device (30) for the occupants of the vehicle. The electronic device makes it possible to carry out a process for the activating in due time of the protective device (30) by the electronic device (20) in the manner that estimated values for the future displacement of the occupant of the vehicle and/or his relative speed with respect to the passenger compartment are estimated in advance and compared with presettable limit values.

18 Claims, 9 Drawing Sheets

PROCEDURE AND DEVICE FOR PROTECTING VEHICLE OCCUPANTS

BACKGROUND INFORMATION

Traffic accidents which endanger the occupants of a vehicle, such as, for instance, impact of the vehicle against a stationary obstacle or collision with another vehicle, is an occurrence which proceeds extremely rapidly and lasts for only about 100 milliseconds from the first contact with the obstacle until its end. On the other hand, protective means for protecting the occupants from injury in an accident, such as safety belts and/or airbags, require a certain minimum amount of time for their activation. By activation, there is understood, for instance, in the case of an airbag, the procedure which extends from the igniting of the gas injection charge until the airbag has been inflated into its protective position. For this, a few dozen milliseconds are required. In the protective systems described above there is therefore the problem, in particular, of noting the potential for endangerment in an accident as early as possible in order to be able to activate the protective system provided in the vehicle so rapidly that, taking into account the time for its activation, it can still contribute to protecting the occupant. For example, an airbag must be inflated sufficiently early that the occupant who is greatly accelerated by the forces occurring upon the accident does not strike his head on parts of the vehicle, for instance the steering wheel, and thereby seriously injure himself. On the other hand, the triggering mechanism for the protective system must not be so sensitive that it responds and activates the protective system at values of acceleration which are not dangerous for the occupants. This would namely result in a high expense for the repair of the unnecessarily activated protective system.

There have been numerous attempts to solve this difficult problem. Thus, a protective device is known from U.S. Pat. No. 4,020,453 which has an acceleration sensor which notes the acceleration of the vehicle and in which the acceleration signal is integrated and the protective system triggered when the integrated acceleration value has exceeded a threshold value which can be preset. In this known safety device therefore, an integrated acceleration value can be preset by a threshold value which is considered so dangerous that the activating of the protective system is then necessary. This known safety device disregards the position in which the occupant to be protected is actually sitting, and which may differ greatly from case to case. For example, the occupant may be sitting with his back pressed firmly against the backrest of the car seat or he may have his head in the vicinity of the instrument panel in order, for instance, better to read a display. However, the optimal protective action of the protective system depends on the position in which the passenger in the vehicle is actually sitting.

Therefore, attempts have also been made to note the actual position of the passenger and take it into account for activation of the protective system. Such protective systems are known, for instance, from Germany Patent Application Nos. DE 40 05 598 A1, DE 38 09 074 A1 and DE 40 23 109 A1. These last-mentioned solutions are, however, comparatively expensive since they require additional sensors such as, for instance, seat contacts, ultrasonic barriers, light barriers or the like, in order to note the actual position of the passenger. The application of such additional sensors and evaluation means for them to different vehicles, and possibly also their adaptation to the different shape of occupants of the vehicle, means a large expense for construction and maintenance. Finally, these additional components may also, as a whole, impair the reliability of the protective system, since defects can occur in the wires and contact means necessary for the connecting of the sensors and evaluation units.

In accordance with a further solution of the problem described above, it has, it is true, been attempted, in accordance with Germany Patent Application No. DE 38 03 426 A1, to take the actual position in which the occupant of the car is sitting into consideration in connection with the activating of the protective system. In accordance with this known solution, however, the actual position in which the occupant is sitting is no longer noted by sensors, but it is attempted to calculate the forward displacement of the occupant which occurs as a result of acceleration by means of the acceleration of the vehicle noted by an acceleration sensor on the basis of a mathematical formula. For the use of this formula, the occupant is considered to be a freely movable mass with respect to the vehicle. Further influences, such as, for instance, the supporting of the driver on the steering wheel, the spring action of the vehicle seats and the like, can be taken into account in the manner that corresponding correction factors describe the forward displacement of the occupant in the manner of a massspring system.

Proceeding from this known prior art, the object of the present invention is to improve the triggering of a protective system for the occupants of vehicles by also taking into account the actual position in which the occupant is sitting.

SUMMARY OF THE INVENTION

The present invention, in particular, offers the advantage that the activation in due time of the protective means provided for the occupants of the vehicle is made possible with due consideration of the displacement of the occupant as the result of acceleration or the relative speed of the passenger with respect to the passenger compartment resulting from the acceleration even without additional sensors which detect the position of the passenger. The activating in due time of the protective means is obtained, in particular, by an estimate of the forward displacement of the occupant which is to be expected within the activation time. This estimate permits a particularly rapid response of the protective means and makes certain that the protective means are activated in due time in the event of danger in order to perform their protective function. This estimate is effected in a particularly suitable manner by means of a smoothed acceleration curve which is obtained by filtering from the actual acceleration measurement signal. Kalman filtering is used to particular advantage. The course of the smoothed acceleration curve can be approximated by a known function, which can be readily controlled, so that acceleration values lying ahead in the future can be determined with relatively little expense.

DETAILED DESCRIPTION OF THE INVENTION

Figure 1:
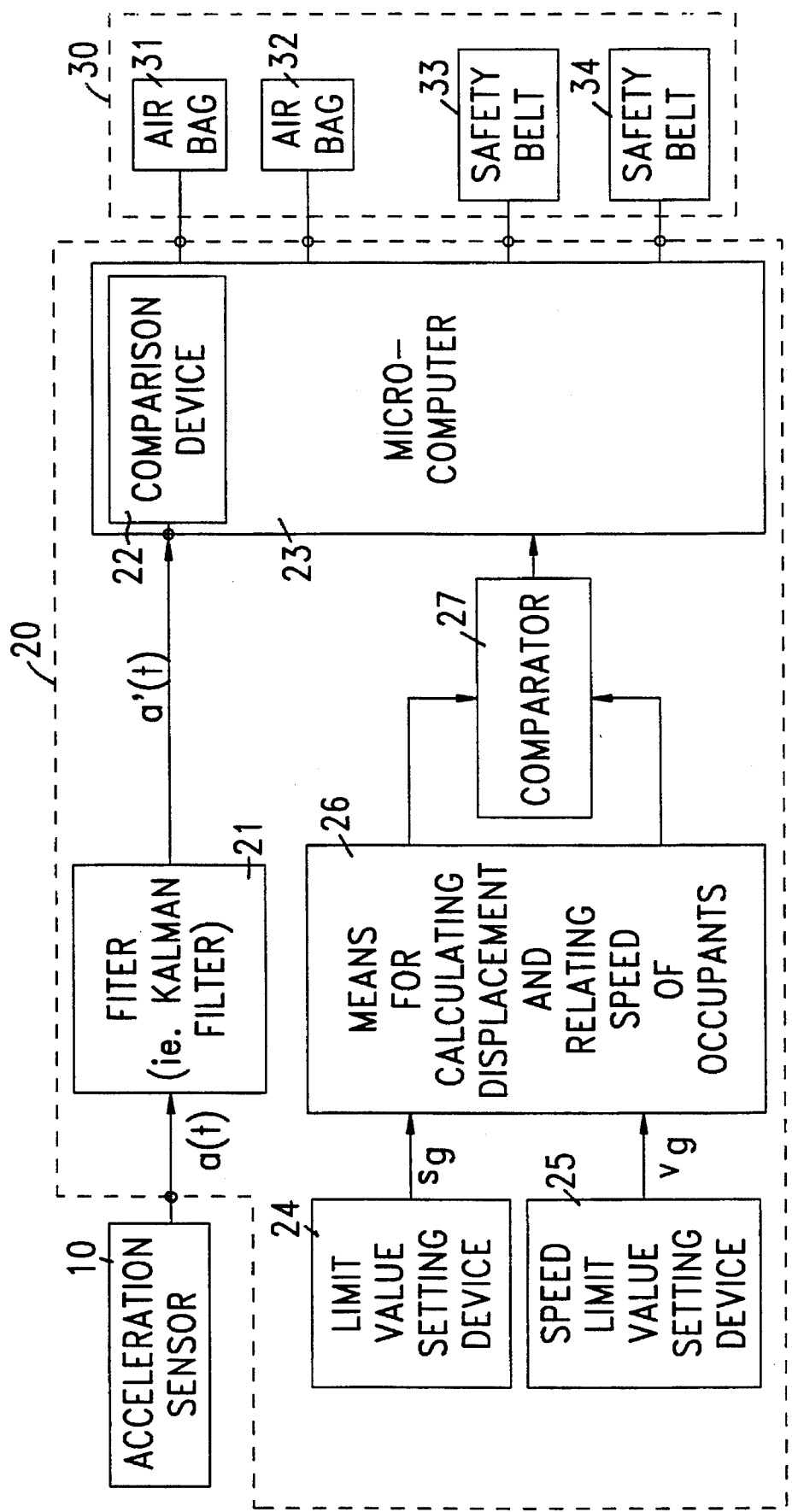
FIG. 1 shows a block diagram of a protective system according to the present invention for protecting vehicle occupants.

FIG. 1 shows a block diagram of a protective system for the occupants of vehicles. This protective system comprises at least one sensor 10 which notes accelerations of the vehicle and is of known type, and may consist, for instance, of a piezoelectric ceramic or of strain gauges which are acted upon in each case by a seismic mass. Upon the action of a force on the seismic mass as a result of an acceleration, the sensor 10, for example, gives off an output voltage which is proportional to the acceleration and which is designated a(t) in the block diagram. The sensor 10 is connected to an electronic device 20 which processes the output signal a(t) from the sensor 10 which is fed to its input side and on its output side actuates the protective means 30 provided for the occupants of the vehicle. The electronic device 20 comprises filter means 21 for filtering the output signal of the sensor 10. As a result of the filtration, the output signal a(t) of the sensor 10 is converted into the signal a' (t). This signal a' (t) is fed to a comparison device 22 which is provided in the electronic device 20 and is preferably part of a microcomputer 23. The electronic device 20 furthermore comprises a device 24 for establishing a limit value $s_g$ for the displacement, particularly the forward displacement, of the occupant, as well as a further device 25 for setting a limit speed value $v_g$ with respect to the relative speed of the occupant with respect to the passenger compartment. The two devices 24 and 25 are connected to a further device 26 which can calculate the displacement and the speed of the occupants for a subsequent point in time. The device 26 is connected to another device 27, the output connection of which is, in its turn, connected to the microcomputer 23. The device 27 determines whether and possibly which of the two values, forward displacement s and speed v, has exceeded the presettable limit values $s_g$ and $v_g$. The corresponding value is fed to the microcomputer 23. The microcomputer 23 is connected on its output side to protective means 30 for the occupants of the vehicle. These protective means preferably comprise a first airbag 31 for the driver of the vehicle, a second airbag 32 for the front seat passenger, and possibly safety belts 33 and 34 for at least the driver and the front seat passenger.

Figure 2A:
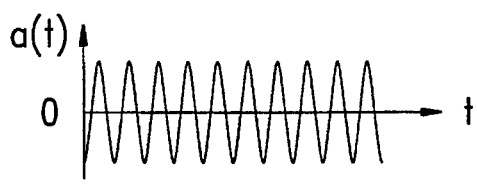
FIG. 2a shows an acceleration signal output as a function of time from a sensor according to the present invention.
Figure 2B:
FIG. 2b shows the relative speed of an occupant of a vehicle with respect to the passenger compartment of the vehicle as a function of time.
Figure 2C:
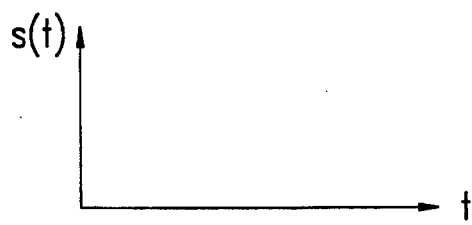
FIG. 2c shows a forward displacement curve of an occupant of a vehicle with respect to time.

In order to facilitate an understanding of the invention, various signal forms as a function of time will first of all be explained below with reference to FIG. 2 and FIG. 3. Thus, FIG. 2a shows the acceleration signal a(t) of the sensor 10, referred to also as acceleration signal. It has been found in practice that even in the event that the vehicle is advancing at uniform speed and therefore not subject substantially to any acceleration in the direction of advance or in the opposite direction, an output signal a(t) of the sensor 10 can be measured which has bipolar components which are substantially symmetrical to the zero line and therefore to the t-axis. One can speak here also of a modulation of the acceleration signal. This modulation is produced by accelerations of the vehicle body caused as a result of the driving movements of the vehicle, these accelerations being measured as acceleration by the sensor 10. FIG. 2b shows the relative speed v(t) of the occupant with respect to the passenger compartment as a function of the time t. This signal can be obtained by integration from the output signal a(t) of the sensor 10. FIG. 2b also shows a course of the signal which has substantially bipolar components of comparatively small amplitude which do not essentially lead to a forward displacement of the occupant. This forward displacement is shown as curve s(t) in the graph of FIG. 2c, which can be determined by integration from the relative speed.

Figure 3A:
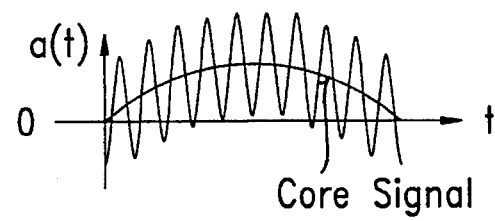
FIG. 3a shows an acceleration signal output as a function of time from a sensor according to the present invention when a vehicle is subjected to an acceleration in the direction of its lengthwise axis.
Figure 3B:
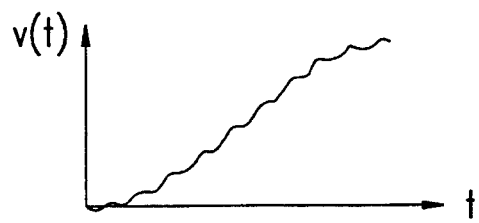
FIG. 3b shows the relative speed of an occupant of a vehicle with respect to the passenger compartment of the vehicle as a function of time when the vehicle is subjected to an acceleration in the direction of its lengthwise axis.
Figure 3C:
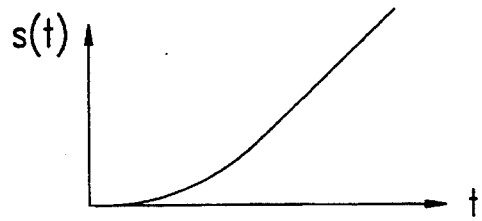
FIG. 3c shows a forward displacement curve of an occupant of a vehicle with respect to time when a vehicle is subjected to an acceleration in the direction of its lengthwise axis.

FIG. 3 shows the corresponding courses of the signal when the vehicle is subjected to an acceleration in the direction of its lengthwise axis, which occurs, for instance, upon an accident. Thus, FIG. 3a again shows the output signal a(t) of the sensor 10 as a function of the time t. A modulated signal form can be noted, which now, however, is only unipolar in essential partial regions, and therefore no longer has components which extend beyond the zero line. FIG. 3b shows the speed signal v(t), which rises substantially linearly except for a modulation due to minor amplitude variations. Finally, FIG. 3c shows the curve s(t) representing the forward displacement of the occupant, which curve is a quadratic function of the time t. After smoothing or filtering, there can be obtained from the modulated output signal a(t) of the sensor 10 shown in FIG. 3a, a curve which in the manner of presentation selected in accordance with FIG. 3a extends substantially above the zero line and can be referred to as "core signal".

Figure 4A:
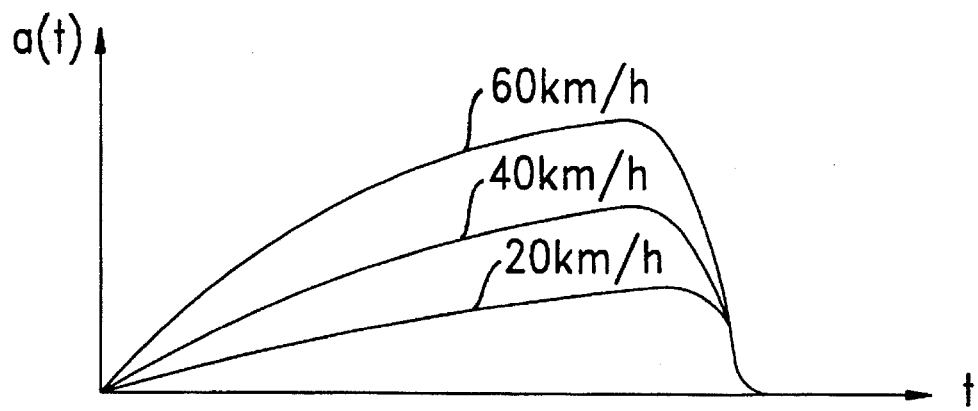
FIG. 4a shows an acceleration signal output as a function of time from a sensor according to the present invention in the case of an idealized standard body at speeds of 20 km/hr, 40 km/hr and 60 km/hr.

For an understanding of the invention, the course of this so-called core signal in the case of different types of vehicle bodies is furthermore important. These types of bodies are explained briefly below with reference to FIG. 4. FIG. 4a shows the course of the output signal a(t) of the sensor 10 as a function of the time t in the case of an idealized standard body with different speeds of 20 km/hr, 40 km/hr and 60 km/hr as parameters. FIG. 4a shows that, with increasing speed, the amplitude of the maximum of the signal a(t) also increases, but that the duration of the effect of the acceleration which commences at the coordinate origin is substantially the same regardless of the speed. Differing from this, the signal forms in FIG. 4b and FIG. 4c, which represent a so-called soft body and a so-called hard body, show completely different courses of the signal. Thus, FIG. 4b, to be sure, shows amplitude values for the maxima of the course of the curve a(t), and therefore the acceleration signal which increase with increasing speed. However, these maxima no longer occur at the same time, and the duration of the effect of the acceleration is of different length. The greatest amplitude with the shortest duration of the acceleration process is present at the highest speed of 60 km/hr.

Figure 4B:
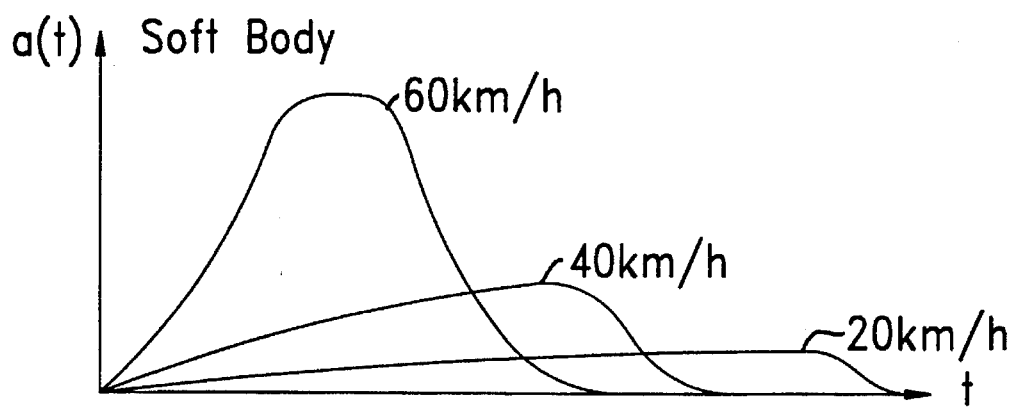
FIG. 4b shows an acceleration signal output as a function of time from a sensor according to the present invention in the case of an idealized soft body at speeds of 20 km/hr, 40 km/hr and 60 km/hr.
Figure 4C:
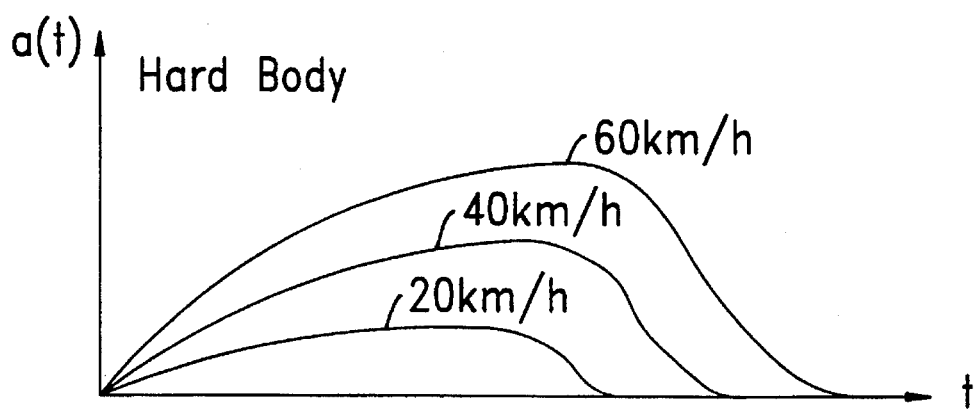
FIG. 4c shows an acceleration signal output as a function of time from a sensor according to the present invention in the case of an idealized hard body at speeds of 20 km/hr, 40 km/hr and 60 km/hr.

With the so-called hard body which is represented by the forms of the signal in FIG. 4c, larger amplitudes of the acceleration signal a(t) which are also proportional to the speed can be noted, occurring at different times in the same way as in the case of the soft body in accordance with FIG. 4b. In contradistinction to the showing in FIG. 4b, however, the duration increases with increasing speed.

Figure 5:
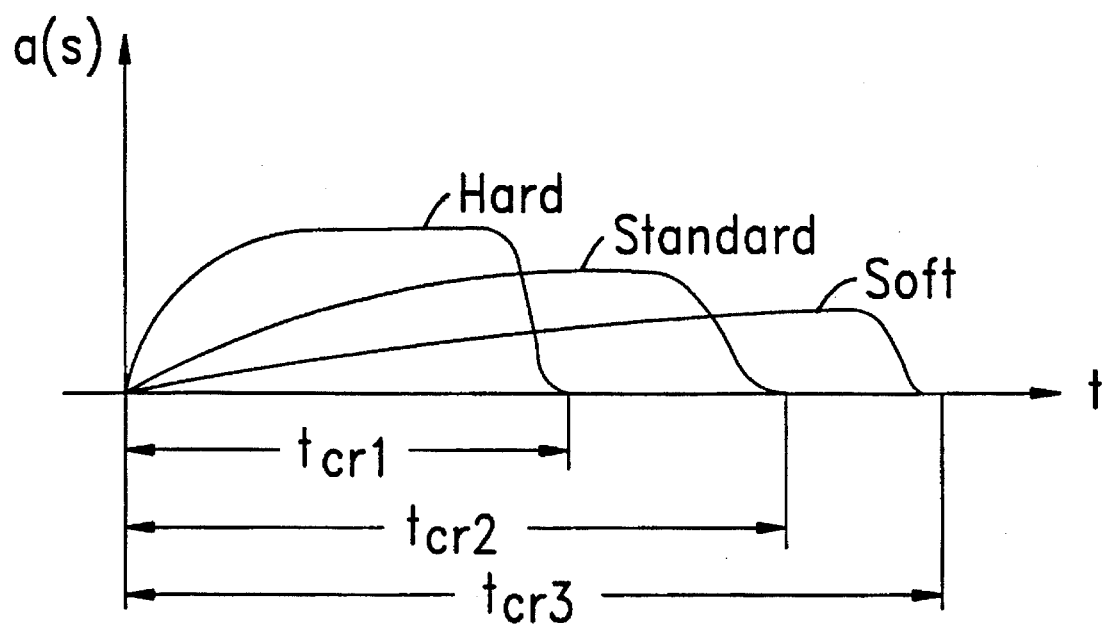
FIG. 5 shows acceleration curves with respect to time of a hard body, standard body and soft body.

The nature of the type of body in question can, with a knowledge of its construction, be determined approximately by means of complex arithmetic programs; in practice, however, the type of body is ordinarily determined empirically in the manner that crash tests are carried out with an experimental specimen of the vehicle at low speeds such as, for instance 20 km/hr. As a result of such empirical crash tests with a hard body, a soft body, and a standard body, the acceleration curves a(t) shown in FIG. 5 are obtained. They, in their turn, show that with different types of bodies, amplitude values of different amount occur upon the action of acceleration, and that furthermore the crash time differs. Thus, for instance, in the case of the hard body, in which the greatest amplitude of acceleration occurs, the crash time is at an end already at the time $t_{cr1}$, while in the case of the soft body, which is characterized by a comparatively low maximal amplitude in the course of the acceleration curve a(t), the crash time is at an end only after the comparatively long time $t_{cr3}$.

Figure 6:
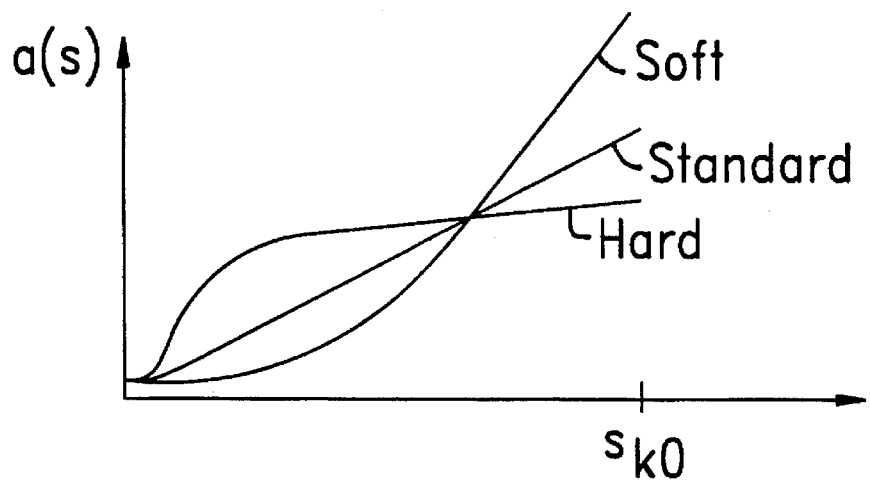
FIG. 6 shows acceleration curves with respect to time of a hard body, standard body and soft body where the crash time is independent of the type of body.
Figure 7:
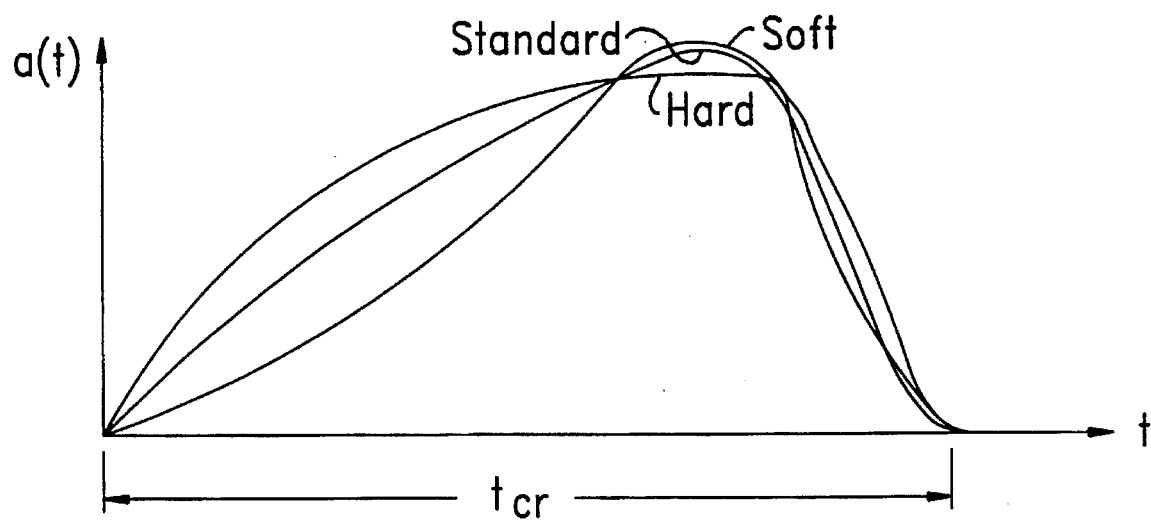
FIG. 7 shows another set of acceleration curves with respect to time of a hard body, standard body and soft body where the crash time is independent of the type of body.

From these results, the surprising relationship can be derived that, as shown in FIGS. 6 and 7, regardless of the nature of the body, there is a given speed $v_0$ at which the crash time $t_{cr}$ is independent of the type of body. The crash time is dependent only on the length of the crusher zone $s_{ko}$ of the vehicle.

Figure 8:
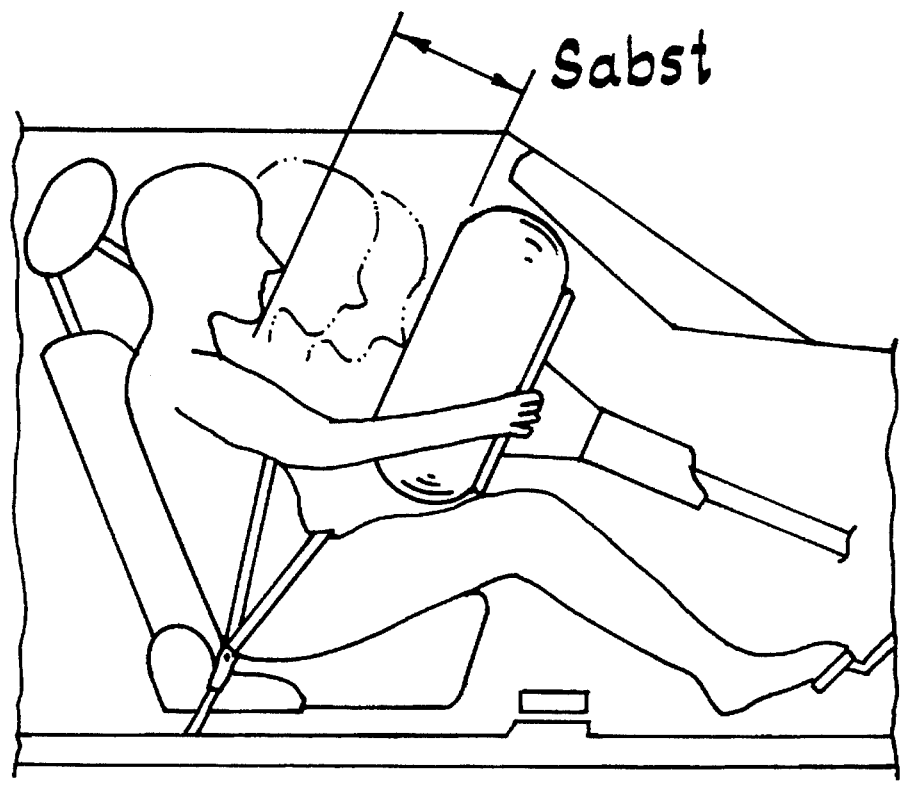
FIG. 8 illustrates the acceleration-dependent displacement of an occupant of a vehicle in the event of a negatively directed action of acceleration.

The diagram in FIG. 8 explains the acceleration-dependent displacement of the occupant, in particular his forward displacement in the event of a negatively directed action of acceleration as is particularly present in the case of an accident. $S_{abst}$ is the maximum path which, for instance, the head of the occupant of the vehicle sitting in normal position can move over until striking against the steering wheel or the activated protective means.

It results from this that with a comparatively slight relative speed of the occupant of the vehicle with respect to the passenger compartment, a longer period of time is available for measuring the distance $S_{abst}$ than in the event of a comparatively higher relative speed.

Figure 9:
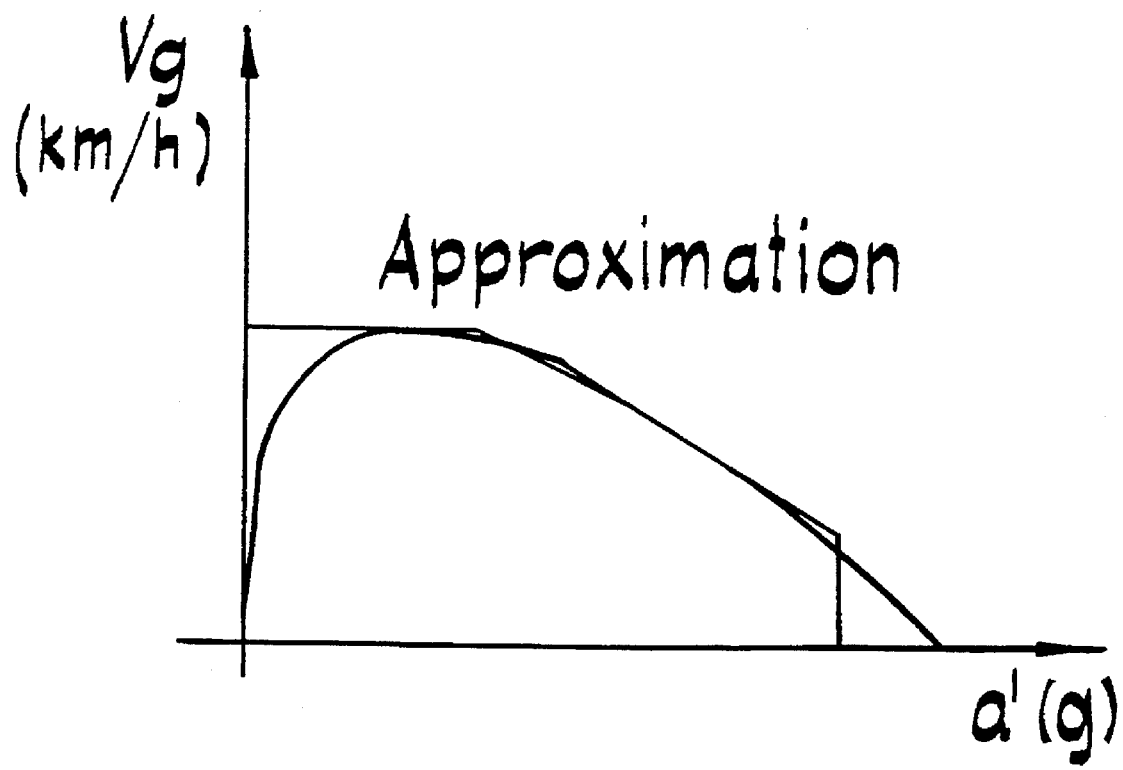
FIG. 9 shows a limit speed value of an occupant of a vehicle with respect to the passenger component of the vehicle as a function of average acceleration.

These relationships are of importance with respect to the final time of activation of the safety means which, as a rule, is independent of the type of accident and the type of body. The safety means should namely be activated so early that it can develop its protective action before the occupant of the vehicle has moved over the maximum available non-critical forward displacement distance $S_{abst}$. Furthermore, FIG. 9 also shows the limit speed value $v_g$ as a function of the average acceleration a'. From this graph, it can be noted that the limit speed value $v_g$, which is a function of the maximum forward displacement distance $S_{abst}$ indicated in FIG. 8 and of the activating time of the protective means, must be reduced with increasing acceleration a' in order still to permit a dependable activating of the protective means.

The findings described above have led to the result that, for any type of body, optimal protection of the occupants of the vehicle can be assured by activation in due time of the existing safety means if the future forward displacement of the occupant of the vehicle caused by the effect of the acceleration and/or the occupant's future relative speed with respect to the passenger compartment are estimated, and if activating of the safety means takes place when the estimate shows that the estimated values exceed presettable limit values within a presettable future time interval. As a presettable future time interval there is indicated in this connection the activation time of the specific protective means, which time is known in each case. In the event of an airbag which is provided as protective means, this presettable time interval is therefore between 10 and 50 milliseconds, and preferably between 20 and 40 milliseconds. If the forward displacement of the occupant to be expected during this time interval or his relative speed with respect to the passenger compartment are estimated in advance, it can be judged whether activation of the safety means is necessary at all and whether the time available is sufficient at all for the unfolding of the protective means.

In connection with the presetting of the limit values for the displacement of the occupant of the vehicle and/or his relative speed with respect to the passenger compartment, the geometry and/or the structure of the passenger compartment and/or of the protective means are advisedly taken into account since they can be dependent on the specific construction. The permissible forward displacement distance $S_{abst}$ is preferably established between about 5 and 30 cm, and preferably between 10 and 20 cm, while the relative speed of the occupant of the vehicle is fixed at between 5 to 30 km/hr, and preferably between 10 and 20 km/hr.

In a first embodiment of the present invention, fixed values which may, for instance, be dependent on the construction are used, as explained above, as presettable limit values.

In one particularly advantageous embodiment of the present invention however, there are used as presettable limit values variable values which are preferably dependent on at least one operating parameter of the vehicle. A particularly favorable, early possibility of activation for the safety means is obtained if the presettable limit values are variable in time and are selected as a function of the crash time. In such a case, at the start of a crash, relatively large limit values are still provided, but then, with increasing duration of the crash, they are decreased, i.e. made smaller. The reduction is effected in this connection advisedly by a function with respect to time which is recognized to be particularly favorable.

For estimating the displacement of the occupant of the vehicle which is to be expected within the period of the time taken into account or the occupant's relative speed to be expected with reference to the passenger compartment of the vehicle, the acceleration signal of the at least one acceleration sensor 10 is evaluated, in which connection, to be sure, recourse is had to an acceleration curve which has been freed of the higher frequency modulation peaks, i.e. filtered, and which is derived advisedly by means of a filtering process from the output signal a(t) of the sensor 10. For this purpose, as already described with reference to FIG. 1, the last-mentioned output signal is fed to a filtering device 21 which produces the output signal $\bar{a}(t)$. In this connection, Kalman filtering of the output signal a(t) of the sensor 10 has proven particularly favorable since particularly reliable estimates could be made possible by means of this filtration. In a first embodiment of the present invention in which only a comparatively slight expense in connection with the processing of the output signal of the sensor 10 is necessary, either only an advance estimate with respect to the forward displacement of the occupant of the vehicle or, as alternative, with respect to the relative speed to be expected is effected. If necessary, the calculations can be repeated several times in order to improve the precision.

In another, more expensive embodiment of the present invention, estimated values for the expected forward displacement of the occupant and for his expected relative speed can be determined simultaneously in evaluation cycles which are independent of each other.

In accordance with an advantageous further embodiment of the present invention, the output signal a(t) of the sensor 10 is subjected repeatedly to a filtration, and therefore filtered at least twice. The output signals $\bar{a}(t)$ and $\bar{a}_{w(t)}$ obtained by means of simple and repeated filtration are then compared with each other and accumulated. The result of the comparison, in its turn, can be related to a presettable threshold value. If the result of the comparison lies above the presettable threshold value, then it can be concluded that there is an accident-produced change in the structure of the vehicle which for instance has disadvantageous consequences for the length of the crush zone available. For example, a body part in the region of the crush zone may break as a result of too high a load, so that no decrease in energy as a result of deforming work is possible any longer. Should such an event occur, a comparison criterion for the reduction of the limit forward displacement value $s_g$ and of the relative limit speed value $v_g$ can be obtained from the comparison between the function value obtained by first filtration and the function value obtained by repeated filtration.

The acceleration time curve $\bar{a}(t)$ which is obtained, smoothed by filtration, from the output signal $\bar{a}(t)$ of the sensor 10 is a substantially sinusoidal function since, like the sine curve, it is unipolar in the first quadrant and rises continuously. In order to be able to effect an advance estimate of the future course of the acceleration and, on basis thereof, the future forward displacement of the occupant of the vehicle or his future relative speed with respect to the passenger compartment, the function $\bar{a}(t)$ is advisedly approximated by an easily calculated approximation function, for instance a sine curve itself, or else a polynomial, preferably of the second or third degree. The function values determined in this way can in practice advantageously be stored in a storage element of the microcomputer 23 of the electronic device 20. In the case of an actual accident, the electronic device 20 can then have access extremely rapidly to the stored table of values and, upon the advance estimate to be effected, determine whether function values of the function $\bar{a}(t)$ lying in the future or the values of forward displacement of the occupant and/or his relative speed which can be derived therefrom exceed the above-mentioned presettable limit values or not. If the exceeding thereof is indicated activation of the safety means can be effected in due time so that a dependable protection of the occupants of the vehicle is made possible.

Figure 10:
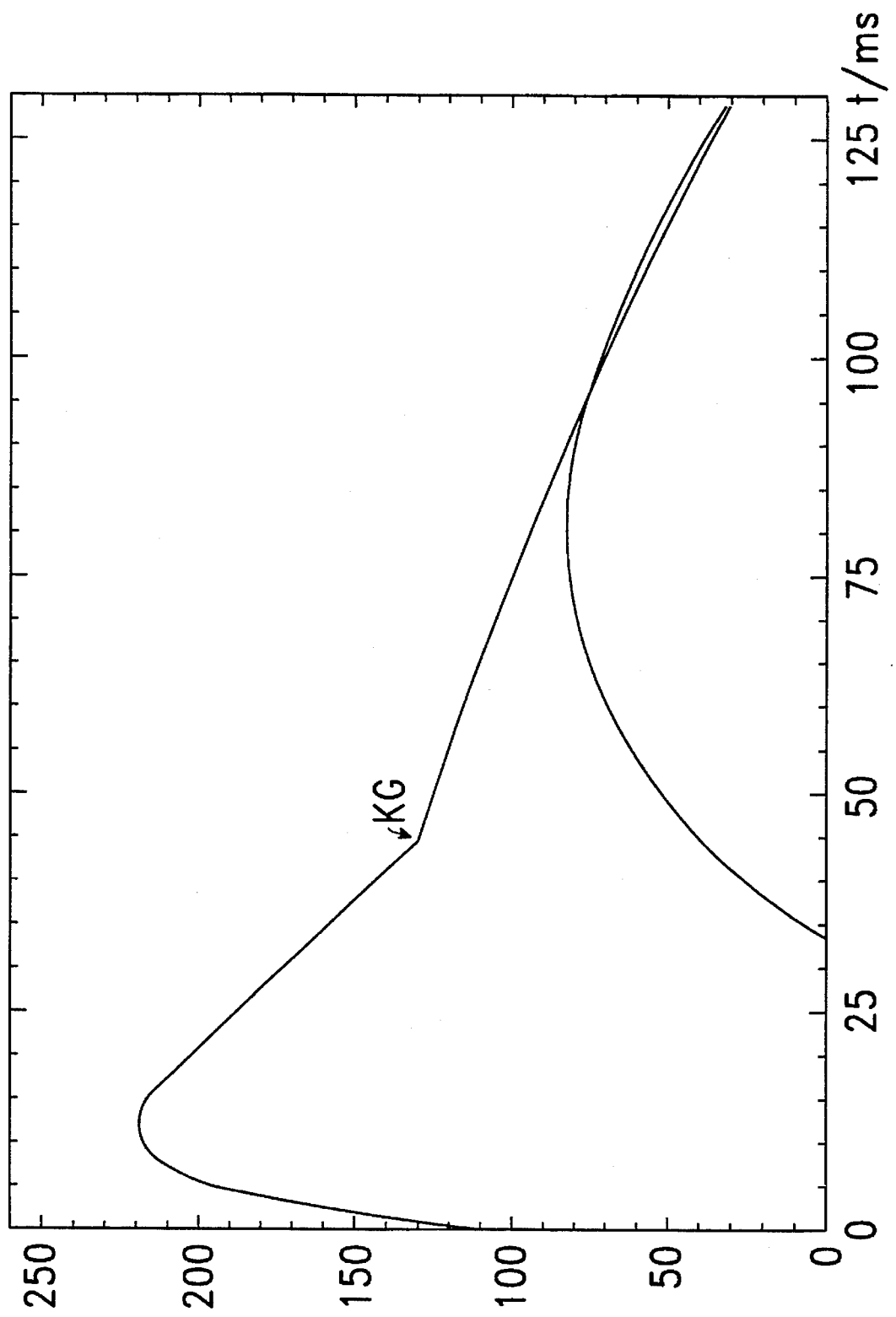
FIG. 10 shows a limit curve according to the present invention having presettable limit values plotted with respect to time.

The present invention will be explained below with reference to FIGS. 10, 11 and 12, on the basis of a crash process which has actually taken place. In this connection, the graph shown in FIG. 10 contains in its upper part a limit curve formed of presettable limit values. In this case, the limit values are dependent on the time. The abscissa corresponds to the time axis, on which the time is plotted in milliseconds. Increments of the corresponding limit value are plotted on the ordinate. From the limit curve, it can be noted that, in the initial phase of the crash, which is assumed to start at the time t=0, comparatively large values of the limit value are preset. Thus, the maximum of the limit curve KG lies in the time interval between 10 and about 15 milliseconds after the start of the crash and then drops off substantially continuously. This means that, with increasing duration of the crash process, the limit condition is made continuously more precise, since the limit values are continuously reduced. If the values determined by advance estimate exceed this limit curve, the safety device is activated, as will still be shown in the following.

Figure 11:
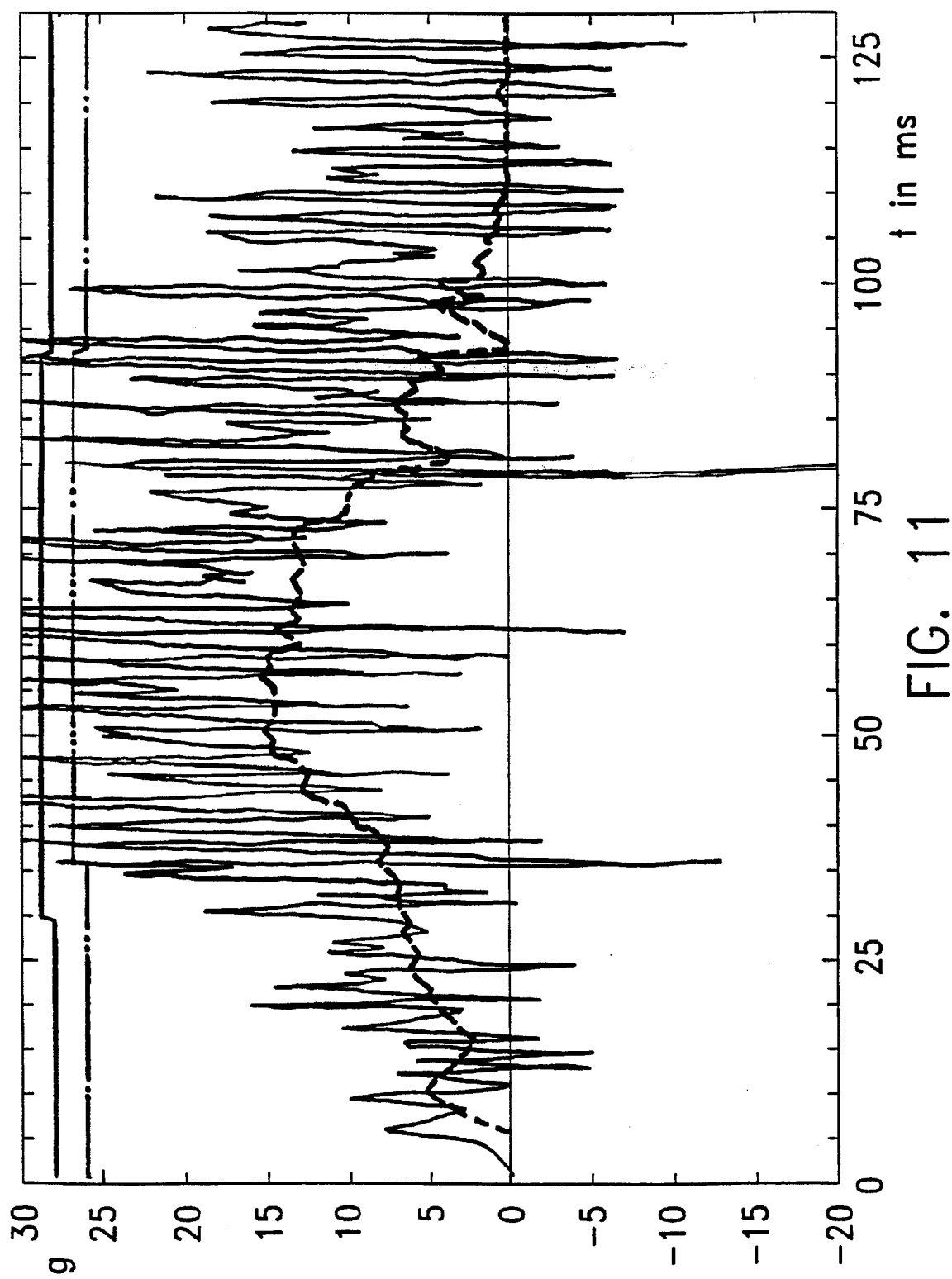
FIG. 11 shows an acceleration signal output as a function of time from a sensor according to the present invention upon an accident.
Figure 12:
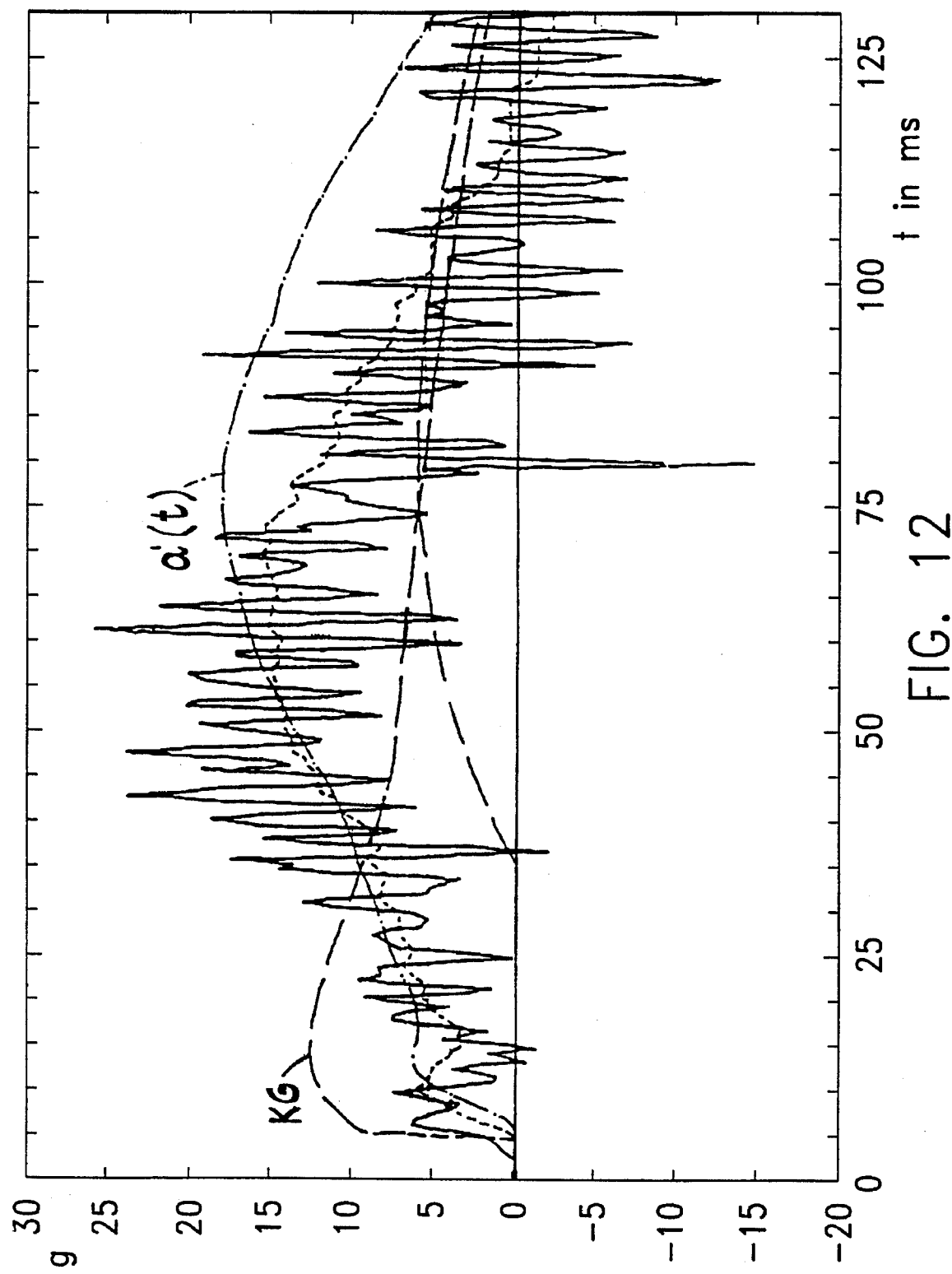
FIG. 12 shows a signal output from a sensor according to the present invention upon an accident, together with a limit curve.

FIG. 11 shows the output signal a(t) of the sensor 10 which the sensor gives off upon a crash. On the abscissa there is again plotted the time t in milliseconds, while positive and negative acceleration values in units of the acceleration due to gravity g are plotted on the ordinate. Finally, FIG. 12 shows, combined in a single graph, the output signal a(t) of the sensor 10 coming from a crash, together with the limit curve KG consisting of limit values and the function $\bar{a}(t)$ obtained by filtration and possible approximation or possibly estimated in advance. An estimate in advance on the basis of the acceleration values measured in the initial phase of the crash, with the aid of the smoothed acceleration curve obtained therefrom by filtration leads to the result that the curve $\bar{a}(t)$ would intersect the limit curve KG at a time of about 35 milliseconds after the start of the crash. The forward displacement of the occupant of the vehicle would in this case be about 15 cm. Based on this prediction, an activating of the protective means within the time interval of 33.1 to 36.0 milliseconds after the start of the crash has been fixed.

What is claimed is:

1. A method for protecting at least one occupant of a vehicle which includes protective means for the at least one occupant, comprising the steps of:

providing at least one acceleration sensor coupled to the protective means for monitoring an acceleration of the vehicle, the at least one acceleration sensor having an output signal corresponding to the acceleration;

filtering the output signal with at least one Kalman filter to obtain at least one of a first estimated value of future forward displacement of the at least one occupant as a function of the acceleration of the vehicle and a second estimated value of future relative speed of the at least one occupant with respect to a passenger compartment of the vehicle; and activating the protective means as a function of at least one of the first estimated value and the second estimated value when at least one of the first estimated value exceeds first predetermined limit values within a predetermined future time interval and the second estimated value exceeds second predetermined limit values within the predetermined future time interval.

2. The method according to claim 1, wherein the protective means includes at least one of an airbag protection system and a seatbelt protection system and wherein the predetermined future time interval includes one of a known activation time of the airbag protection system and a known activation time of the seatbelt protection system.

3. The method according to claim 1, wherein the protective means includes an airbag protection system and the predetermined future time interval is between 5 and 50 milliseconds after the start of a crash.

4. The method according to claim 3, wherein the predetermined future time interval is between 25 and 35 milliseconds after the start of a crash.

5. The method according to claim 1, wherein the first predetermined limit values and the second predetermined limit values are determined as a function of at least one of a structure of the passenger compartment of the vehicle and a structure of the protective means.

6. The method according to claim 5, wherein the first predetermined limit values are between 5 centimeters and 30 centimeters for the future forward displacement of the at least one occupant of the vehicle.

7. The method according to claim 5, wherein the first predetermined limit values are between 10 centimeters and 20 centimeters for the future forward displacement of the at least one occupant of the vehicle.

8. The method according to claim 5, wherein the second predetermined limit values are between 5 km/hr and 30 km/hr for the future relative speed of the at least one occupant with respect to the passenger compartment of the vehicle.

9. The method according to claim 5, wherein the second predetermined limit values are between 10 km/hr and 25 km/hr for the future relative speed of the at least one occupant with respect to the passenger compartment of the vehicle.

10. The method according to claim 1, further comprising the steps of:
    filtering the output signal at least twice to provide a first filtered signal and a second filtered signal;
    comparing the first filtered signal and the second filtered signal to provide at least one comparison value thereby indicating whether there has been an accident-caused structural change of the vehicle;
    accumulating the at least one comparison value; and
    comparing the at least one comparison value with at least one of the first predetermined limit values and the second predetermined limit values, wherein when the at least one comparison value exceeds at least one of the first predetermined limit values and the second predetermined limit values, a correction criterion is derived for adjusting at least one of the first predetermined limit values and the second predetermined limit values.

11. The method according to claim 1, wherein the first predetermined limit values and the second predetermined limit values are determined as a function of at least one operating parameter of the vehicle.

12. The method according to claim 11, wherein the first predetermined limit values and the second predetermined limit values are determined as a function of the duration time of an accident.

13. The method according to claim 1, wherein the first predetermined limit values and the second predetermined limit values are made more precise after a predetermined period of time as a function of an increasing duration time of an accident.

14. The method according to claim 1, wherein the output signal is approximated by an approximation function.

15. The method according to claim 14, wherein the approximation function includes one of a trigonometric function and a low order polynomial.

16. The method according to claim 14, wherein approximation function provides at least one approximation function value that is stored in a storage element from which the at least one approximation function value can be read during an accident.

17. The method according to claim 1, wherein the first predetermined limit values and the second predetermined limit values form a limit curve formed by a convolution of a Gaussian function with a function obtained by at least one filtering of the output signal with the at least one Kalman filter.

18. A device for protecting at least one occupant of a vehicle which includes at least one protective means for the at least one occupant, comprising:
    at least one acceleration sensor coupled to the protective means for monitoring an acceleration of the vehicle, the at least one acceleration sensor having an output signal corresponding to the acceleration; and
    at least one electronic device for evaluating the output signal and controlling the protective means in response to the output signal, the electronic device including,
    means for evaluating the position of the at least one occupant in the vehicle,
    means for determining at least one of first predetermined limit values for future forward displacement of the at least one occupant as a function of the acceleration of the vehicle and second predetermined limit values for future relative speed of the at least one occupant with respect to a passenger compartment of the vehicle,
    means for filtering the output signal with at least one Kalman filter to obtain at least one of a first estimated value of future forward displacement of the at least one occupant as a function of the acceleration of the vehicle and a second estimated value of future relative speed of the at least one occupant with respect to a passenger compartment of the vehicle, and
    means for estimating whether at least one of the first estimated value exceeds first predetermined limit values within a predetermined future time interval and the second estimated value exceeds second predetermined limit values within the predetermined future time interval and means for activating the protective means as a function of at least one of the first and second estimated values.

* * * * *